US007836954B2

(12) United States Patent
Morgan et al.

(10) Patent No.: US 7,836,954 B2
(45) Date of Patent: Nov. 23, 2010

(54) CEMENT COMPOSITIONS COMPRISING STEVIA RETARDERS

(75) Inventors: Ronnie G. Morgan, Waurika, OK (US); William J. Caveny, Duncan, OK (US); Rickey L. Morgan, Duncan, OK (US)

(73) Assignee: Halliburton Energy Services. Inc., Duncan, OK (US)

( * ) Notice: Subject to any disclaimer, the term of this patent is extended or adjusted under 35 U.S.C. 154(b) by 203 days.

(21) Appl. No.: 12/340,049

(22) Filed: Dec. 19, 2008

(65) Prior Publication Data

US 2010/0155069 A1 Jun. 24, 2010

(51) Int. Cl.
*E21B 33/138* (2006.01)
*C04B 24/00* (2006.01)
*C04B 24/10* (2006.01)
*C09K 8/467* (2006.01)

(52) U.S. Cl. .................. 166/293; 106/731; 106/805; 507/204; 507/269

(58) Field of Classification Search ................ None
See application file for complete search history.

(56) References Cited

U.S. PATENT DOCUMENTS

| | | | |
|---|---|---|---|
| 2,619,181 A | 11/1952 | Lea et al. | |
| 2,674,320 A | 4/1954 | Cutforth | |
| 2,779,417 A * | 1/1957 | Clark, Jr. et al. | 166/293 |
| 3,104,704 A * | 9/1963 | Kucera et al. | 166/293 |
| 3,615,223 A | 10/1971 | Burrqughs et al. | |
| 3,954,489 A | 5/1976 | Uchikawa et al. | |
| 4,095,987 A | 6/1978 | Walker | |
| 4,131,480 A | 12/1978 | McCurrich et al. | |
| 4,432,801 A | 2/1984 | Tegiacchi et al. | |
| 4,502,969 A | 3/1985 | Shell | |
| 5,220,960 A | 6/1993 | Totten et al. | |
| 5,264,470 A | 11/1993 | Eoff | |
| 5,281,270 A | 1/1994 | Totten et al. | |
| 5,447,197 A | 9/1995 | Rae et al. | |
| 5,547,506 A | 8/1996 | Rae et al. | |
| 5,728,209 A | 3/1998 | Bury et al. | |
| 6,173,778 B1 | 1/2001 | Rae et al. | |
| 6,227,294 B1 | 5/2001 | Chatterji et al. | |
| 6,461,658 B1 | 10/2002 | Merkel et al. | |
| 6,722,433 B2 | 4/2004 | Brothers et al. | |
| 6,797,050 B2 | 9/2004 | Hoffman et al. | |
| 6,832,652 B1 | 12/2004 | Dillenbeck et al. | |
| 7,021,380 B2 | 4/2006 | Caveny et al. | |
| 7,067,000 B1 | 6/2006 | Szymanski et al. | |
| 7,285,165 B2 | 10/2007 | Caveny et al. | |
| 7,303,625 B2 | 12/2007 | Caveny et al. | |
| 7,395,861 B2 | 7/2008 | Caveny et al. | |
| 7,422,062 B2 | 9/2008 | Caveny et al. | |
| 7,435,293 B2 | 10/2008 | Caveny et al. | |
| 7,618,490 B2 * | 11/2009 | Nakashima et al. | 106/724 |
| 2001/0050031 A1 | 12/2001 | Bredt et al. | |
| 2003/0091714 A1 | 5/2003 | Merkel et al. | |
| 2003/0176293 A1 | 9/2003 | Schilling et al. | |
| 2006/0091572 A1 | 5/2006 | Santra et al. | |
| 2007/0054059 A1 * | 3/2007 | Nakashima et al. | 427/427 |
| 2007/0125277 A1 | 6/2007 | Caveny et al. | |
| 2007/0125278 A1 | 6/2007 | Caveny et al. | |
| 2007/0125538 A1 | 6/2007 | Caveny et al. | |
| 2007/0125539 A1 | 6/2007 | Caveny et al. | |
| 2007/0129260 A1 | 6/2007 | Caveny et al. | |
| 2007/0129261 A1 | 6/2007 | Caveny et al. | |

FOREIGN PATENT DOCUMENTS

| | | |
|---|---|---|
| EP | 0582367 | 2/2004 |
| WO | 2004076376 | 9/2004 |
| WO | 2005036986 | 10/2004 |

OTHER PUBLICATIONS

"Stabilizer 434D™ Surfactant," Cementing, Halliburton, H06120, Feb. 2008.
"HR®-25, Cement Retarder," Cementing, Halliburton, H01479, Aug. 2008.
"Halad®-413, Fluid Loss Additive," Cementing, Halliburton, H01332, Aug. 207.
"Halad®-344, Fluid Loss Additive," Cementing, Halliburton, H01331, Aug. 2007.
"WG-17 LXP™ Free-Water Control Agent," Cementing, H02150, May 2006.
"Latex 2000, Cement Additive," Cementing, Halliburton, H01336-A4, Aug. 2006.
"SA-541™ Suspending Aid," Halliburton web page, Dec. 2008.
"Suspend HT™ Additive, Suspending Agent," Cementing, Halliburton, H01462, Aug. 2007.
"CFR-3™ Cement Friction Reducer, Dispersant," Cementing, Halliburton, H01325, Oct. 2005.
"D-Air 3000™ and D-Air 3000L™, Defoamers," Cementing, Halliburton, H02518-A4, Jun. 2007.
"SSA-1™ Strength-Stabilizing Agent," Cementing, Halliburton, H01340, Aug. 2007.
"Product Forms," Cargill web site, Dec. 2008.
"Stevia," Wikipedia, pp. 1-8, May, 2008.
"Inulin," Wikipedia, pp. 1-4, May, 2008.
Lauren Etter and Betsy McKay, "Coke, Cargill Set Ambitious Push For Sweetner, Partners Tout Rebiana as Natural, No-Calorie; Steep Hurdles Remain," The Wall Street Journal, vol. CCXLIX, No. 126, pp. 1, A10, May 31, 2007.
Geuns, Jan M.C. "Stevioside" Phytochemistry, vol. 64, pp. 913-921 (2003).
International Search Report for PCT/GB2009/002893 dated Mar. 15, 2010.

* cited by examiner

*Primary Examiner*—George Suchfield
(74) *Attorney, Agent, or Firm*—Craig W. Roddy; Baker Botts LLP

(57) ABSTRACT

Methods and compositions that include a method of cementing comprising providing a cement composition comprising water, a hydraulic cement, and an additive comprising at least one additive selected from the group consisting of a stevia retarder and inulin; placing the cement composition in a subterranean formation; and permitting the cement composition to set in the formation.

20 Claims, No Drawings

CEMENT COMPOSITIONS COMPRISING STEVIA RETARDERS

BACKGROUND

The present invention relates to cementing operations, and, in certain embodiments, to cement compositions that comprise stevia retarders and associated methods.

Hydraulic cement compositions commonly are utilized in surface and subterranean cementing operations. Examples of subterranean cementing operations include, for example, subterranean well completion and remedial operations. For example, cement compositions may be used in primary cementing operations whereby pipe strings such as casings and liners are cemented in well bores. In primary cementing operations, cement compositions may be pumped into the annular space between the walls of a well bore and the exterior surface of a pipe string disposed therein. The cement composition is permitted to set in the annular space, thereby forming an annular sheath of hardened substantially impermeable cement in the annular space that supports and positions the pipe string in the well bore and bonds the exterior surface of the pipe string to the walls of the well bore. Cement compositions also are used in remedial cementing operations such as plugging highly permeable zones or fractures in well bores, plugging cracks and holes in pipe strings, and the like.

Subterranean cementing operations generally occur under a wide variety of well bore conditions, for example, ranging from shallow wells (less than about 1,000 feet) to extremely deep wells (greater than about 35,000 feet). As used herein, a cement composition is considered pumpable when it has a yield point less than 100 Pa and a plastic viscosity less than 500 cp, whereby yield point and plastic viscosity are defined via the conventional Bingham Plastic viscosity model (see pages 15-18, Rheology Methods in Food Processing Engineering, by James F. Steffe, Freeman Press, 2807 Still Valley Dr., East Lansing Mich., 48823, USA, ISBN #0-9632036-0-6). Conventional set retarder compositions often have been included in cement compositions, so as to retard the set time of the cement composition until the cement composition has reached its ultimate location within the subterranean formation. Examples of conventional set retarder compositions commonly used in cementing operations for delaying the set time of a cement composition, include, for example, lignosulfonates, organic acids, phosphonic acid derivatives, synthetic polymers (e.g., copolymers of 2-acrylamido-2-methyl-propane sulfonic acid ("AMPS") and unsaturated carboxylic acids), inorganic borate salts, and combinations thereof. However, conventional set retarder compositions such as those described above may be costly and problematic in some instances. For example, conventional set retarder compositions often undesirably may slow the development of a cement's compressive strength. Furthermore, conventional set retarder compositions may affect gas-migration-control properties, and may not be suitable for use in certain applications.

SUMMARY

The present invention relates to cementing operations, and, in certain embodiments, to cement compositions that comprise stevia retarders and associated methods. As used herein, the term "stevia retarder" refers to any composition formed from the plant species *Stevia rebaudiana*.

An embodiment of the present invention provides a method of cementing comprising: providing a cement composition comprising water, a hydraulic cement, and an additive comprising at least one additive selected from the group consisting of a stevia retarder, inulin, and combinations thereof; placing the cement composition in a subterranean formation; and permitting the cement composition to set in the formation.

Another embodiment of the present invention provides a method of retarding a set time of a cement composition comprising: adding an additive comprising at least one additive selected from the group consisting of a stevia retarder, inulin, and combinations thereof to a cement composition that comprises a hydraulic cement and water.

Another embodiment of the present invention provides a cement composition comprising: a hydraulic cement; water; and an additive comprising at least one additive selected from the group consisting of a stevia retarder, inulin, and combinations thereof.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to cementing operations, and, in certain embodiments, to cement compositions that comprise stevia retarders and associated methods. While the compositions and methods of the present invention are useful in a variety of applications, they may be particularly useful for subterranean well completion and remedial operations, such as primary cementing of casings and liners in well bores, including those in production wells, which include multi-lateral subterranean wells. They also may be useful for surface cementing operations, including construction cementing operations.

Embodiments of the cement compositions of the present invention generally comprise a cement, water, and an additive that comprises a stevia retarder. In certain embodiments the additive may comprise inulin in addition to, or in the place of, the stevia retarder. Among other things, the presence of a stevia retarder in embodiments of the cement compositions of the present invention may retard the setting time of the cement compositions of the present invention, without delaying compressive strength development. In some embodiments, the stevia retarder, inter alia, may retard the setting time of the cement compositions while accelerating early compressive strength development. In certain embodiments, the cement compositions of the present invention comprising a stevia retarder ultimately may develop compressive strength that exceeds the compressive strength that the cement compositions of the present invention ultimately would develop without the presence of the stevia retarder. Certain embodiments of the cement compositions of the present invention may further enhance gas migration control properties in oil and gas wells. In some embodiments, the presence of the stevia retarder in the cement composition may contribute to a viscosity appropriate for discouraging any flow of gas into the annulus.

Those of ordinary skill in the art will appreciate that the cement compositions generally should have a density suitable for a particular application. By way of example, the cement composition may have a density in the range of from about 4 pounds per gallon ("lb/gal") to about 25 lb/gal. In certain embodiments, the cement compositions may have a density in the range of from about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Cements suitable for use in subterranean applications are suitable for use in embodiments the present invention. Furthermore, cements suitable for use in surface applications (e.g., construction cements) also may be suitable for use in embodiments of the present invention. In certain embodiments, the cement compositions of the present invention comprise a hydraulic cement. A variety of hydraulic cements may be suitable for use, such as those comprising one or more of calcium, aluminum, silicon, oxygen, and sulfur, which set and harden by reaction with water. Such hydraulic cements include, but are not limited to, Portland cements, pozzolanic cements, gypsum cements, high alumina content cements, silica cements, high alkalinity cements, slag cements, shale cements, cement kiln dust, particles of various rubbers, elastomers and plastics, and mixtures thereof. In certain embodiments, the hydraulic cement may comprise an API cement, such as API Classes A, B, C, G, H, or J Portland cements, or equivalents thereof. The above-mentioned API cements are defined and described in API Specification for Materials and Testing for Well Cements, API Specification 10A, Twenty-Third Edition, April, 2002.

The water utilized in embodiments of the cement compositions of the present invention may be fresh water, saltwater (e.g., water containing one or more salts dissolved therein), brine (e.g., saturated saltwater), or seawater. Generally, the water may be from any source, provided that it does not contain an excess of compounds that undesirably affect the cement compositions. The water may be present in an amount sufficient to form a pumpable slurry. Generally, the water may be present in embodiments of the cement compositions of the present invention in an amount in the range of from about 15% to about 200% by weight of cement ("bwoc") therein. In certain embodiments, the water may be present in the cement compositions of the present invention in an amount in the range of from about 25% to about 60% bwoc therein.

The cement compositions of the present invention also may comprise an additive that comprises a stevia retarder. As set forth above, the term "stevia retarder" refers to any composition formed from the plant species *Stevia rebaudiana*. The stevia retarder may comprise the actual *Stevia rebaudiana* plant, leaves of the *Stevia rebaudian* plant, extracts from the *Stevia rebaudiana* plant, products from the *Stevia rebaudiana* plant, and by-products from the *Stevia rebaudiana* plant. In some embodiments, the stevia retarder may comprise stevia by-products such as steviol, stevioside, and rebaudioside A, in both purified and unpurified forms. In some embodiments, the stevia retarder may comprise synthetic compounds of steviol, steviosdie, and rebaudioside A. In some embodiments, the stevia retarder may comprise a filler. Suitable fillers may comprise gypsum, sand, and any nonreactive low cost material with a density similar to sand. The stevia retarder may be granulated, powdered, or in liquid form. Additonally, when the stevia retarder comprises the actual *Stevia rebaudiana* plant or leaves of the *Stevia rebaudiana* plant, the stevia retarder may comprise ground pulp. A suitable source of stevia retarder is commercially available from Steviva Brands, Inc., Portland, Oreg., under the trade name "STEVIVA™" stevioside.

Generally, the additive that comprises a stevia retarder may be present in embodiments of the cement compositions of the present invention in an amount sufficient to retard the setting of the cement compositions of the present invention for a desired time. The amount of stevia retarder that may be included may depend on a number of factors, including, but not limited to, the bottom hole circulating temperature of the well into which the cement composition is to be placed, density of the cement composition, the particular formulation of the chosen stevia retarder, and the like. In some embodiments, the quantity of the stevia retarder to be included in the cement composition may be determined prior to preparation of the cement composition. For example, the quantity of the stevia retarder to be included in the cement composition may be determined by performing thickening time tests of the type described in API Specification 10A, Twenty-Third Edition, April, 2002. More particularly, in certain embodiments, the stevia retarder may be present in the cement compositions of the present invention in an amount in the range of from about 0.01% to about 5% bwoc. In some embodiments, the stevia retarder may be present in the cement compositions of the present invention in an amount in the range of from about 0.1% to about 2% bwoc.

In certain embodiments of the present invention, the additive included in embodiments of the present invention may comprise about 100% stevia retarder. In certain embodiments of the present invention, the stevia retarder may be combined with an organic acid to form another additive of the present invention. Examples of organic acids that may be suitable include, but are not limited to, citric acid, gluconic acid, tartaric acid, and salts thereof. In certain embodiments of the present invention, the stevia retarder may be present in the additive of the present invention in an amount in the range of from about 0.1% to about 99.9% by weight. In certain embodiments of the present invention, one or more organic acids may be present in the additive of the present invention in an amount in the range of from about 0.1% to about 99.9% by weight. In certain embodiments of the present invention, the additive of the present invention that comprise the stevia retarder and an organic acid may comprise about 60% to about 90% stevia retarder by weight, and about 10% to about 40% organic acid by weight. In certain embodiments of the present invention, the additive of the present invention that comprise the stevia retarder and an organic acid may comprise about 70% to about 80% stevia retarder by weight, and about 20% to about 30% organic acid by weight. In certain embodiments of the present invention, the additive of the present invention that comprise the stevia retarder and an organic acid may comprise about 40% to about 60% stevia retarder by weight, and about 40% to about 60% organic acid by weight. In certain embodiments of the present invention the additive of the present invention that comprise the stevia retarder and an organic acid may comprise tartaric acid in an amount in the range of from about 10% to about 70% by weight of the stevia retarder. In certain embodiments of the present invention the additive of the present invention that comprise the stevia retarder and an organic acid may comprise organic acid in an amount in the range of from about 25% to about 45% by weight of the stevia retarder.

In certain embodiments of the present invention, the additive comprising a stevia retarder may comprise, inter alia, borate compounds, including acids comprising borate compounds, and salts of such acids. Examples of suitable borate compounds include, for example, boric acid, potassium pentaborate, and the like. In certain embodiments of the present invention, the additive comprising a stevia retarder may comprise, inter alia, phosphorus compounds, including acids comprising phosphorus compounds, and salts of such acids. Examples of suitable phosphorus compounds include, for example, phosphates, phosphonates, and the like. In certain embodiments of the present invention, the additive comprising a stevia retarder may comprise, inter alia, a wide variety of lignins and tannins. In certain embodiments of the present invention, the additive comprising a stevia retarder may comprise, inter alia, hydrolyzed copolymers of acrylamide ("AA") and 2-acrylamido, 2-methyl propane sulfonic acid ("AMPS"). In certain embodiments of the present invention, the additive comprising a stevia retarder may comprise, inter alia, sugar compounds, including, for example, dextrose, sucrose, fructose, and the like.

In certain embodiments of the present invention, the additive may comprise a polysaccharide such as inulin. The inulin, for example, may be included in addition to, or in place of, the stevia retarder. In certain embodiments of the present invention, the stevia retarder may be present in the additive of the present invention in an amount in the range of from about 0% to about 100% by weight. In certain embodiments of the present invention, inulin may be present in the additive of the present invention in an amount in the range of from about 0% to about 100% by weight. In certain embodiments of the present invention, the additive of the present invention that comprise the stevia retarder and inulin may comprise about 60% to about 90% stevia retarder by weight, and about 10% to about 40% inulin by weight. In certain embodiments of the present invention, the additive of the present invention that comprise the stevia retarder and inulin may comprise about 70% to about 80% stevia retarder by weight, and about 20% to about 30% inulin by weight. In certain embodiments of the present invention, the additive of the present invention that comprise the stevia retarder and inulin may comprise about 60% to about 40% stevia retarder by weight, and about 40% to about 60% inulin by weight.

The additive of the present invention comprising a stevia retarder may retard the setting of the cement compositions of the present invention at a variety of temperatures, including temperatures of up to about 200° F. in certain embodiments, temperatures of up to about 250° F. in certain embodiments, temperatures of up to about 300° F. in certain embodiments, temperatures of up to about 350° F. in certain embodiments, and temperatures greater than about 350° F. in certain embodiments.

The cement compositions of the present invention comprising an additive that comprises a stevia retarder may be suitable for use at a variety of temperatures. Certain embodiments of the cement compositions of the present invention are suitable for use at temperatures of up to about 200° F. Certain embodiments of the cement compositions of the present invention are suitable for use at temperatures of up to about 250° F. Certain embodiments of the cement compositions of the present invention are suitable for use at temperatures of up to about 300° F. Certain embodiments of the cement compositions of the present invention are suitable for use at temperatures of up to about 350° F. Certain embodiments of the cement compositions of the present invention may be suitable for use at temperatures greater than about 350° F. In some embodiments, additives may be included in the cement compositions of the present invention to facilitate use at elevated temperatures.

Optionally, embodiments of the cement compositions of the present invention may comprise a dispersant. When present, the dispersant, among other things, may control the rheology of the cement composition and stabilize the cement composition over a broad density range. A variety of dispersants known to those skilled in the art may be used in accordance with the present invention. An example of a suitable dispersant comprises a water-soluble polymer prepared by the caustic-catalyzed condensation of formaldehyde with acetone wherein the polymer contains sodium sulfate groups, which dispersant is commercially available under the trade designation "CFR-3™" dispersant from Halliburton Energy Services, Inc., Duncan, Okla. Another suitable dispersant is commercially available under the trade designation "CFR-2™" dispersant, also from Halliburton Energy Services, Inc. Where used, the dispersant may be present in the cement compositions of the present invention in an amount in the range of from about 0.1% to about 2.0% bwoc. In some embodiments, the dispersant may be present in the cement compositions of the present invention in an amount in the range of from about 0.1% to about 1.0% bwoc.

Optionally, embodiments of the cement compositions of the present invention may comprise a hydratable polymer. When present in the cement compositions of the present invention, the hydratable polymer may increase the viscosity of the cement compositions of the present invention, among other things. Various hydratable polymers can be utilized in the cement compositions of the present invention including, but not limited to, carboxymethylcellulose, hydroxyethylcellulose, carboxymethylhydroxyethylcellulose, vinyl sulfonated polymers, and hydratable graft polymers. An example of a suitable hydratable polymer is a cellulose derivative commercially available from Dow Chemical Co., under the trade name "CARBOTRON 20." Where used, the hydratable polymer may be present in the cement compositions of the present invention in an amount sufficient to contribute a desired degree of viscosity to the cement composition slurries of the present invention. In some embodiments, the hydratable polymer may be present in the cement compositions of the present invention in an amount in the range of from about 0.01% to about 5% bwoc. In some embodiments, the hydratable polymer may be present in the cement compositions of the present invention in an amount in the range of from about 0.1% to about 2% bwoc.

As will be recognized by those skilled in the art, the cement compositions of this invention also may include additional suitable additives, including, among other things, accelerants, latex stabilizers, defoamers, silica, microspheres, viscosifiers, fibers, weighting materials, salts, vitrified shale, calcium hydroxide, fly ash, fluid loss control additives, set retarders and the like. Other additional additives may include, but are not limited to, weight reducing additives, heavyweight additives, lost circulation materials, filtration control additives, dispersants, suspending agents, and combinations thereof. Suitable examples of these additives include crystalline silica compounds, amorphous silica, salts, fibers, hydratable clays, microspheres, pozzolan additives, latex cement, thixotropic additives, combinations thereof and the like. Any suitable additive may be incorporated within the cement compositions of the present invention. An example of a suitable defoamer is commercially available from Halliburton Energy Services, Inc., of Duncan, Okla., under the trade name "D-AIR 3000L™" antifoaming agent. An example of a suitable silica is a fine silica flour that is commercially available from Halliburton Energy Services, Inc., of Duncan, Okla., under the trade name "SSA-1™" fine silica flour. An example of a suitable high-temperature viscosifier is commercially available from Halliburton Energy Services, Inc., of Duncan, Okla., under the trade name "SUSPEND HT" anti-settling additive. An example of a suitable free-water and solids suspending agent is commercially available from Halliburton Energy Services, Inc., of Duncan, Okla., under the trade name "SA-541™" suspending aid. Examples of suitable fluid loss control additives are commercially available from Halliburton Energy Services, Inc., at various locations, under the trade names "FWCA" additive, LATEX 2000™, "HALAD® 9," "HALAD® 344," "HALAD® 400," and "HALAD® 413." Examples of suitable set retarders include various organic acids including, but not limited to, tartaric acid, citric acid, gluconic acid, oleic acid, phosphoric acid, and uric acid. An example of a suitable tartaric acid is commercially available from Halliburton Energy Services, Inc., of Duncan, Okla., under the trade name "HR®-25" retarder. An example of a suitable latex stabilizer is commercially available from Halliburton Energy Services, Inc., under the trade name "STA-BILIZER 434D." Another example of a compound that may be suitable for inclusion in the cement compositions of the present invention is an additive comprising octoborate, such as disodium octoborate that is commercially available from Spectracide Chemicals. One of ordinary skill in the art, with the benefit of this disclosure, will be able to recognize where a particular additive is suitable for a particular application.

To facilitate a better understanding of the present invention, the following examples of certain aspects of some embodiments are given. In no way should the following examples be read to limit, or define, the entire scope of the invention.

EXAMPLES

Example 1

Sample cement compositions were prepared as follows. A cementitious material (Texas Lehigh Class H cement), water, and a liquid stevia retarder (1.15 SG) or a dry stevia retarder were sheared in a blender at about 13,000 rpm for 35 seconds to form a cement slurry weighing 16.4 lb/gal. Tests were run to determine the pump time of the sample composition at high temperature and high pressure according to API RP 10B-2, "Recommended Practices for Testing Oil-Well Cements and Cement Additives," dated 2005. Sample Composition Nos. 6 and 9 were tested using an ultrasonic cement analyzer to determine the strength of each sample composition at a desired temperature and pressure.

Sample Composition No. 1 (comparative) comprised Texas Lehigh Class H cement and 39% water bwoc, with no stevia retarder.

Sample Composition No. 2 comprised Texas Lehigh Class H cement, 0.1 gal/sk (1.02% bwoc) of a liquid stevia retarder, and 38.3% water bwoc.

Sample Composition No. 3 comprised Texas Lehigh Class H cement, 0.2 gal/sk (2.04% bwoc) of a liquid stevia retarder, and 37.52% water bwoc.

Sample Composition No. 4 comprised Texas Lehigh Class H cement, 0.5 gal/sk (5.1% bwoc) of a liquid stevia retarder, and 35.28% water bwoc.

Sample Composition No. 5 comprised Texas Lehigh Class H cement, 0.2% powdered stevia retarder bwoc, and 39.4% water bwoc.

Sample Composition Nos. 6-8 comprised Texas Lehigh Class H cement, 0.3% powdered stevia retarder bwoc, 35% silica flour bwoc, and 48.55% water bwoc.

Sample Composition Nos. 9 and 10 comprised Texas Lehigh Class H cement, 1% powdered stevia retarder bwoc, 35% silica flour bwoc, and 48.55% water bwoc.

Sample Composition No. 11 comprised Texas Lehigh Class H cement, 1.5% powdered stevia retarder bwoc, 35% silica flour bwoc, and 48.55% water bwoc.

Sample Composition No. 12 comprised Texas Lehigh Class H cement, 1% powdered stevia retarder bwoc, 1% tartaric acid bwoc, 35% silica flour bwoc, and 48.55% water bwoc.

The results of the testing are set forth in Table 1 below.

TABLE 1

| Sample Composition | Test Temperature | Pump Time (hr:min) | 50 Psi Time (hr:min) | 500 Psi Time (hr:min) | 24 Hr. Strength (psi) | 48 Hr. Strength (psi) | 48 Hr. Crush (psi) |
|---|---|---|---|---|---|---|---|
| No. 1 | 154° F. | 1:12 | | | | | |
| No. 2 | 154° F. | 2:32 | | | | | |
| No. 3 | 154° F. | 7:21 | | | | | |
| No. 4 | 154° F. | 16 HRS+ | | | | | |
| No. 5 | 154° F. | 23 HRS+ | | | | | |
| No. 6 | 220° F. | 5:08 | 5:54 | 7:12 | 2249 | 2601 | 4880 (at 45 hr) |
| No. 7 | 230° F. | 2:29 | | | | | |
| No. 8 | 250° F. | 1:31 | | | | | |
| No. 9 | 300° F. | 6:41 | 3:33 | 5:03 | 2891 | 3362 | 5982 (at 66 hr) |
| No. 10 | 325° F. | 2:52 | | | | | |
| No. 11 | 350° F. | 2:42 | | | | | |
| No. 12 | 400° F. | 1:05 | | | | | |

As can be seen by Table 1, embodiments of the cement compositions of the present invention comprising stevia retarders may provide pump times suitable for use in certain applications.

Example 2

Sample cement compositions were prepared as follows. A cementitious material (Texas Lehigh Class H cement), water, and leaves from the *Stevia rebaudiana* plant were sheared in a blender at about 13,000 rpm for 35 seconds to form a cement slurry weighing 16.4 pounds per gallon. Tests were run to determine the pump time of the sample composition at high temperature and high pressure according to API RP 10B-2, "Recommended Practices for Testing Oil-Well Cements and Cement Additives," dated 2005.

Sample Composition No. 13 (comparative) comprised Texas Lehigh Class H cement and 39% water bwoc, with no stevia retarder.

Sample Composition No. 14 comprised Texas Lehigh Class H cement, 0.2% *Stevia rebaudiana* leaves bwoc, and 39.4% water bwoc. In this sample, the leaves were hand ground with a mortar and pedestal prior to combination with the cement and water. The samples became very thick, but did not set into hard cement.

Sample Composition No. 15 comprised Texas Lehigh Class H cement, 0.5% *Stevia rebaudiana* leaves bwoc, and 39.4% water bwoc. In this sample, the leaves were hand ground with a mortar and pedestal prior to combination with the cement and water. The samples became very thick, but did not set into hard cement.

Sample Composition Nos. 16 and 17 comprised Texas Lehigh Class H cement, 0.2% *Stevia rebaudiana* leaves bwoc, 39.4% water bwoc, and 0.3% dispersant bwoc. In this sample, the leaves were ground with a UDY mill prior to combination with the cement and water.

Sample Composition No. 18 comprised Texas Lehigh Class H cement, 0.4% *Stevia rebaudiana* leaves bwoc, 39.4% water bwoc, and 0.3% dispersant bwoc. In this sample, the leaves were hand ground with a mortar and pedestal prior to combination with the cement and water.

Sample Composition No. 19 comprised Texas Lehigh Class H cement, 0.9% *Stevia rebaudiana* leaves bwoc, 35% silica powder bwoc, 48.55% water bwoc, and 0.3% dispersant bwoc. In this sample, the leaves were hand ground with a mortar and pedestal prior to combination with the cement and water.

Sample Composition No. 20 comprised Texas Lehigh Class H cement, 1.2% *Stevia rebaudiana* leaves bwoc, 35% silica powder bwoc, 48.55% water bwoc, and 0.3% dispersant bwoc. In this sample, the leaves were ground with a UDY mill prior to combination with the cement and water.

The results of the testing are set forth in Table 2 below.

TABLE 2

| Sample Composition | Test Temperature | Pump Time (hr:min) |
| --- | --- | --- |
| No. 13 | 154° F. | 1:12 |
| No. 14 | 154° F. | 1:39 |
| No. 15 | 154° F. | 0:27 |
| No. 16 | 154° F. | 3:12 |
| No. 17 | 154° F. | 3:19 |
| No. 18 | 154° F. | 7:24 |
| No. 19 | 230° F. | 1:20 |
| No. 20 | 230° F. | 3:21 |

As can be seen by Table 2, embodiments of the cement compositions of the present invention comprising stevia leaves may provide pump times suitable for certain applications.

Example 3

Sample cement compositions were prepared as follows. A cementitious material (Texas Lehigh Class H cement), water, and a stevia retarder comprising 95% stevioside (with 60% of the stevioside comprising rebaudioside A) were sheared in a blender at about 13,000 rpm for 35 seconds to form a cement slurry weighing 16.4 lb/gal. Tests were run to determine the pump time of the sample composition at high temperature and high pressure according to API RP 10B-2, "Recommended Practices for Testing Oil-Well Cements and Cement Additives," dated 2005.

Sample Composition No. 21 comprised Texas Lehigh Class H cement, 1% powdered stevia retarder bwoc, 35% silica flour bwoc, 0.5% dispersant bwoc, and 48.55% water bwoc.

Sample Composition No. 22 comprised Texas Lehigh Class H cement, 2% powdered stevia retarder bwoc, 35% silica flour bwoc, 0.5% dispersant bwoc, and 48.55% water bwoc.

The results of the testing are set forth in Table 3 below.

TABLE 3

| Sample Composition | Test Temperature | Pump Time (hr:min) |
| --- | --- | --- |
| No. 21 | 300° F. | 1:34 |
| No. 22 | 300° F. | 2:01 |

As can be seen by Table 3, embodiments of the cement compositions of the present invention comprising a stevia retarder comprising 95% stevioside (with 60% of the stevioside comprising rebaudioside A) may provide pump times suitable for use in certain applications.

Example 4

Sample cement compositions were prepared as follows. A cementitious material (Texas Lehigh Class H cement), water, inulin powder, and optionally a stevia retarder comprising 100% stevia were sheared in a blender at about 13,000 rpm for 35 seconds to form a cement slurry weighing 16.4 lb/gal. Tests were run to determine the pump time of the sample composition at high temperature and high pressure according to API RP 10B-2, "Recommended Practices for Testing Oil-Well Cements and Cement Additives," dated 2005.

Sample Composition No. 23 comprised Texas Lehigh Class H cement, 0.5% powdered inulin bwoc, 35% silica flour bwoc, and 48.55% water bwoc.

Sample Composition No. 24 comprised Texas Lehigh Class H cement, 1% powdered inulin bwoc, 35% silica flour bwoc, 0.25% dispersant bwoc, and 48.55% water bwoc. The samples became very thick, but did not set into hard cement.

Sample Composition No. 25 comprised Texas Lehigh Class H cement, 0.5% powdered inulin bwoc, 0.5% powdered stevia retarder bwoc, 35% silica flour bwoc, 0.25% dispersant bwoc, and 48.55% water bwoc. The samples became very thick, but did not set into hard cement.

Sample Composition No. 26 comprised Texas Lehigh Class H cement, 0.95% powdered inulin bwoc, 0.05% powdered stevia retarder bwoc, 35% silica flour bwoc, 0.25% dispersant bwoc, and 48.55% water bwoc.

Sample Composition No. 27 comprised Texas Lehigh Class H cement, 1% powdered inulin bwoc, 35% silica flour bwoc, 0.5% dispersant bwoc, and 48.55% water bwoc.

The results of the testing are set forth in Table 4 below.

TABLE 4

| Sample Composition | Test Temperature | Pump Time (hr:min) |
| --- | --- | --- |
| No. 23 | 230° F. | 2:45 |
| No. 24 | 230° F. | 2:10 |
| No. 25 | 230° F. | 3:07 |
| No. 26 | 230° F. | 2:08 |
| No. 27 | 140° F. | N/A |

As can be seen by Table 4, embodiments of the cement compositions of the present invention further comprising an inulin powder may provide pump times suitable for use in certain applications.

Example 5

Sample cement compositions were prepared as follows. A cementitious material (Texas Lehigh Class H cement), water, and different types of inulin powder obtained from Cargill were sheared in a blender at about 13,000 rpm for 35 seconds to form a cement slurry weighing 16.4 pounds per gallon. Tests were run to determine the pump time of the sample composition at high temperature and high pressure according to API RP 10B-2, "Recommended Practices for Testing Oil-Well Cements and Cement Additives," dated 2005.

Sample Composition No. 28 comprised Texas Lehigh Class H cement, 1% powdered inulin bwoc (type F97 supplied by Cargill, 15407 McGinty Road West, Wayzata, Minn. 55391), 35% silica flour bwoc, 0.25% dispersant bwoc, and 48.55% water bwoc. The samples became very thick, but did not set into hard cement.

Sample Composition No. 29 comprised Texas Lehigh Class H cement, 1% powdered inulin bwoc (instant medium type supplied by Cargill), 35% silica flour bwoc, 0.25% dispersant bwoc, and 48.55% water bwoc.

Sample Composition No. 30 comprised Texas Lehigh Class H cement, 1% powdered inulin bwoc (desurgared medium type supplied by Cargill), 35% silica flour bwoc, 0.25% dispersant bwoc, and 48.55% water bwoc. The samples became very thick, but did not set into hard cement.

Sample Composition No. 31 comprised Texas Lehigh Class H cement, 1% powdered inulin bwoc (instant medium type supplied by Cargill), 35% silica flour bwoc, 0.25% dispersant bwoc, and 48.55% water bwoc.

The results of the testing are set forth in Table 5 below.

TABLE 5

| Sample Composition | Inulin | Test Temperature | Pump Time (hr:min) |
| --- | --- | --- | --- |
| No. 28 | Type F97 | 230° F. | 1:26 |
| No. 29 | Instant Medium Type | 230° F. | 2:34 |
| No. 30 | Desurgared Medium Type | 230° F. | 2:35 |
| No. 31 | Instant Medium Type | 200° F. | >19:00 |

As can be seen by Table 5, embodiments of the cement compositions of the present invention further comprising an inulin powder may provide pump times suitable for use in certain applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of cementing comprising:
   providing a cement composition comprising water, a hydraulic cement, and a stevia retarder;
   placing the cement composition in a subterranean formation; and
   permitting the cement composition to set in the formation.

2. The method of claim 1 wherein the stevia retarder is selected from the group consisting of: a *Stevia rebaudiana* plant, a leaf of the *Stevia rebaudiana* plant, an extract from the *Stevia rebaudiana* plant, a product from the *Stevia rebaudiana* plant, a by-product from the *Stevia rebaudiana* plant, and combinations thereof.

3. The method of claim 1 wherein the stevia retarder is selected from the group consisting of: steviol, stevioside, rebaudioside A, any derivative thereof, and combinations thereof.

4. The method of claim 1 wherein the stevia retarder is present in the cement composition in an amount in the range of from about 0.01% to about 5% by weight of the hydraulic cement.

5. The method of claim 1 wherein the cement composition further comprises an organic acid.

6. The method of claim 5 wherein the organic acid is selected from the group consisting of tartaric acid, gluconic acid, citric acid, salts thereof, and combinations thereof.

7. The method of claim 1 wherein the stevia retarder comprises a synthetic stevia retarder.

8. The method of claim 1 wherein the stevia retarder is present in an additive in the cement composition, the additive further comprising a filler.

9. The method of claim 1 wherein the water is present in the cement composition in an amount in the range of from about 15% to about 200% by weight of the hydraulic cement.

10. A method of retarding a set time of a cement composition comprising:
    adding a stevia retarder to a cement composition that comprises a hydraulic cement and water, placing the cement composition in a subterranean formation; and permitting the cement composition to set in the formation.

11. The method of claim 10 wherein the stevia retarder is selected from the group consisting of: a *Stevia rebaudiana* plant, a leaf of the *Stevia rebaudiana* plant, an extract from the *Stevia rebaudiana* plant, a product from the *Stevia rebaudiana* plant, a by-product from the *Stevia rebaudiana* plant, and combinations thereof.

12. The method of claim 10 wherein the stevia retarder is selected from the group consisting of: steviol, stevioside, rebaudioside A, any derivative thereof, and combinations thereof.

13. The method of claim 10 wherein the stevia retarder is present in the cement composition in an amount in the range of from about 0.01% to about 5% by weight of the hydraulic cement.

14. The method of claim 10 the cement composition further comprises an organic acid.

15. The method of claim 14 wherein the organic acid is selected from the group consisting of tartaric acid, gluconic acid, citric acid, salts thereof, and combinations thereof.

16. The method of claim 10 wherein the stevia retarder comprises a synthetic stevia retarder.

17. The method of claim 10 wherein the stevia retarder is added to the cement composition in an additive, wherein the stevia retarder is present in the additive in an amount in the range of from about 0.01% to about 99.9% by weight of the additive.

18. The method of claim 10 wherein the water is present in the cement composition in an amount in the range of from about 15% to about 200% by weight of the hydraulic cement.

19. The method of claim 1 wherein the cement composition further comprises inulin.

20. The method of claim 10 wherein the cement composition further comprises inulin.

* * * * *